United States Patent

[11] 3,577,775

[72] Inventor Albert G. Henderson
    Hereford, Md.
[21] Appl. No. 833,911
[22] Filed June 17, 1969
[45] Patented May 4, 1971
[73] Assignee the United States of America as represented by the Secretary of the United States Air Force

[54] BOND LINE TEST TOOL
    2 Claims, 2 Drawing Figs.
[52] U.S. Cl.................................................. 73/95,
                                                   73/150
[51] Int. Cl. ........................................ G01n 19/04
[50] Field of Search.......................................... 73/95, 150
    (A); 29/191.4, (Inquired), (Scientific Library)

[56] References Cited
    UNITED STATES PATENTS
2,473,517 6/1949 Freedman .................... 73/150(A)
3,336,797 8/1967 Raffalovich .................. 73/150(A)

OTHER REFERENCES
ASTM, Standard Method of " Tension Test of Flat Sandwich Constructions in Flatwise Plane," designation ASTM, C297-61.

Primary Examiner—James J. Gill
Assistant Examiner—Marvin Smollar
Attorneys—Harry A. Herbert, Jr. and Arsen Tashjian ABSTRACT: A tool for testing the integrity of a bond line at the interface of the skin and core of a honeycomb panel structure. The tool includes, as major components, means for gripping a wall of a core cell of the honeycomb panel, means for applying a controlled tensile pull to the bond line at the skin-to-core interface by pulling on the gripped core cell wall, and means for supporting and guiding the gripping means and the tensile pull means.

Patented May 4, 1971 3,577,775
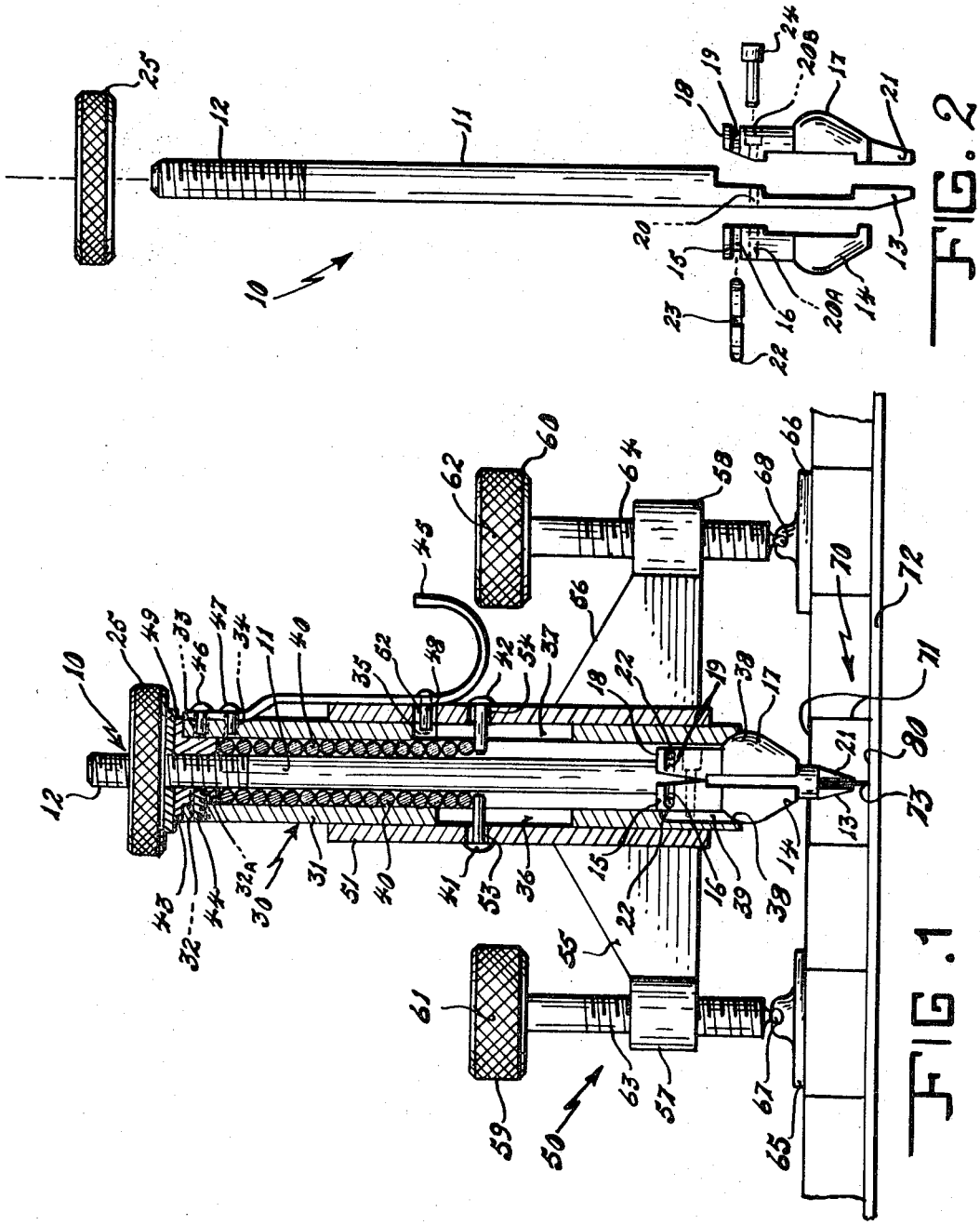
INVENTOR.
ALBERT G. HENDERSON
BY Harry A. Herbert Jr
and
Arsen Tashjian
ATTORNEYS

BOND LINE TEST TOOL

BACKGROUND OF THE INVENTION

This invention relates to a tool for testing the effectiveness of the adhesive bond between two surfaces and, more particularly, to a tool for testing the integrity of the adhesive bond between the skin and the core of a honeycomb panel structure.

As used herein, the term "integrity" is intended to mean, and to be synonymous with, "soundness," "completeness," "effectivenessc" and the like. Further, the term "honeycomb" is intended to include "honeycomb type."

The art of honeycomb panel structure and manufacture has advanced rapidly. Problems such as range of materials useable for skin and for core, varieties of bonding adhesives, limits of bonding pressure and temperature and the like are being rapidly resolved. The result is that paneling of a honeycomb structure is being manufactured which is of extraordinary strength-to-weight ratio and is of remarkable core-to-skin apparent bond integrity. Nevertheless, it is obvious that a honeycomb panel structure of the adhesive bond type is, in essence, only as effective as the actual integrity of the core-to-skin bond. In that regard, the state of the art of testing such an adhesive core-to-skin bond has not significantly advanced, except that one can conclude that the actual integrity of the bond can, or should, be equated to the particular adhesive used and to the care with which the bonding process was performed. However, the actual integrity of the bond can only be definitely ascertained by determining, by testing, the integrity of the particular bond line. As far as is known by the applicant, there is no simple, inexpensive, time-saving, compact, and yet reliable tool for testing the integrity of a honeycomb panel structure skin-to-core adhesive-type bond line.

My invention fulfills the critical need for such a tool and, thereby, significantly advances the state of the art.

SUMMARY OF THE INVENTION

This invention relates to a tool for testing the integrity of an adhesive bond line and, more specifically, for testing the integrity of the adhesive bond line at the skin-to-core interface of a honeycomb panel structure.

An object of this invention is to provide a tool for testing the integrity of a bond line between components which have been bonded with the use of adhesives.

Another object of this invention is to provide a tool for testing the integrity of the adhesive bond line at the skin-to-core interface of a honeycomb panel structure.

Still another object is to provide a tool which will permit the achievement of the foregoing objects, and yet is inexpensive to manufacture, is simple in construction and operation, and is time-saving and compact, and is highly reliable.

These, and still other and related, objects of this invention will become rapidly readily apparent after a consideration of the description of the invention and reference to the drawings.

DESCRIPTION OF THE DRAWINGS

FIG. 1 shows a side elevation view of a preferred embodiment of the invention, partly in cross section, and partly in schematic form; and FIG. 2 is an exploded side elevation view of the gripping means of the preferred embodiment shown in FIG. 1.

DESCRIPTION OF THE PREFERRED EMBODIMENT

With reference to FIG. 1, therein is shown a preferred embodiment of the invention positioned for use on honeycomb panel structure 70 to test the integrity of adhesive bond line 80 at the interface of honeycomb core 71 and skin 72 at core 73.

As shown in FIG. 1, my invention comprises, broadly speaking, means for gripping 10, means for applying a controlled tensile pull 30, and means for supporting and guiding 50 means 10 and 30 which are combined or integrated to form one unit.

It is to be noted that the term "gripping" or the like, as used herein, is intended to mean "capable of grasping and firmly holding."

More specifically, and with reference to FIGS. 1 and 2, wherein the same reference characters are used to designate the same components, the means for gripping 10, includes: rod or shaft 11, preferably of drill rod steel, threaded at one end 12, the upper end, and tapered at the other end 13, to form one of two jaws, and a suitably positioned longitudinal aperture 20 near end 13; a half-pear configurated component 14, preferably of hot-rolled steel and affixed by brazing to the lower portion of rod 11, with component 14 having a flanged upper end 15, a journaled longitudinal portion 16, and a longitudinal aperture 20A which is in line with aperture 20 of rod 11; another, i.e., a second, half-pear configurated component 17, preferably of hot-rolled steel, having a flanged upper end 18, a journaled longitudinal portion 19, a longitudinal aperture 20B in line with aperture 20 of rod 11 and aperture 20A of component 14, and a jaw configurated lower extremity 21 shaped to mate with jaw 13 of rod 11; a retaining ring 22, preferably of music wire, having a vertical slit 23 and being of dimensions suitable for fitting into journaled portions 16 and 19 of components 14 and 17, respectively, and holding 14 and 17, together; an aligning and holding pin 24, preferably of drill rod steel, of dimensions suitable for fitting into apertures 20B, 20, and 20A and aligning and holding components 17, 11 and 14; and knob 25, preferably of aluminum and knurled, holed and threaded at its geometric center to mate with threaded upper end 12 of rod 11.

Again with reference to FIG. 1, the means for applying a controlled tensile pull 30, includes: a first hollow cylindrical tube 31, preferably of aluminum, having suitably positioned openings 32, 33, 34 and 35, diametrically opposed slots 36 and 37, beveled bottom periphery 38, an alignment groove 39; cylindrical coil spring 40 which is compressed between pins 41 and 42 at its lower end, and at its upper end by collar 43 with longitudinal opening 32A, which collar 43, in turn, is held in position by retaining pin 44 which fits into aligned openings 32 and 32A; and a trigger 45 having an upwardly extending loop, with said trigger 45 mounted to tube 31 by fasteners 46 and 47 fitted into respective openings 33 and 34, and having a trigger pin 48, affixed to trigger 45, which fits into suitably positioned opening 35, permitting trigger 45 to releasably engage tube 31.

Spacer 49 is a washer which fits onto rod 11 and is interposed between knob 25 and collar 43.

With reference to FIG. 1, the supporting and guide means 50 for gripping means 10 and tensile pull means 30, includes as components: a second hollow cylindrical tube 51 having suitably positioned openings 52, 53 and 54 in its wall, with two of the openings 53 and 54 being diametrically opposed; two winglike support plates 55 and 56 affixed to the external surface of tube 51; bosses 57 and 58 affixed, respectively, to the terminus of support plates 55 and 56, and each boss 57 and 58 holed and threaded vertically; and swivel pad clamps 59 and 60, each having a vertically positioned post 63 and 64 which is threaded to mate with, and is fitted into and through, its respective threaded boss 57 and 58, with each threaded post 63 and 64 having integral to it, and perpendicular to its long axis, a knurled knob 61 and 62 at the upper end and a footing 65 and 66 at the lower end, with each footing 65 and 66 being joined to its respective post 63 and 64 by a ball and socket swivel joint 67 and 68.

In summary, as can be easily ascertained from FIGS. 1 and 2 and the preceding description, the invention structurally includes gripping means 10 and tensile pull means 30, combined and integrated to form, essentially, one structured unit, with the components of means 10 and 30, in essence, housed in, attached or affixed to, and protruding from tube 31 which, in turn, is vertically movable within stationary tube 51, which also acts as a guide for the movement of tube 31 and which, as part of support means 50, assists in supporting means 10 and tensile pull means 30. More specifically, second hollow cylindrical tube 51 surrounds first hollow cylindrical tube 31 and is attached thereto.

MODE OF OPERATION OF THE PREFERRED EMBODIMENT

When a structure of honeycomb panel is to be tested for adhesive bond line integrity, the honeycomb panel is placed skin down and core up, and the invented testing tool is used in the vertical position, as shown in FIG. 1.

It is assumed, for the sake of clarity, that adhesive bond line 80 is in a plane parallel to the plane of the skin; that bond line 80 is at the interface of the core walls, such as 73, and skin 72; and that the core walls, such as 73, are perpendicular to the plane of skin 72.

It is further assumed that the desired, or necessary, tensile strength of adhesive bond line 80 has been determined in pounds, such as 10 pounds; that spring 40 of tensile pull means 30 has been compressed to the length necessary to deliver the desired tensile pull which is equal to the desired bond line tensile strength, such as 10 pounds in this instance. In this connection, it is pointed out that the length of the annular space in which spring 40 is housed may be varied by changing the position of openings 53 and 54 and, thereby, changing the location of pins 41 and 42 and the length and amount of compression of spring 40.

Assuming that all of the foregoing has been done, knurled knob 25, FIGS. 1 and 2, is rotated counterclockwise, i.e., to the reader's right, thereby causing it to rise on rod 11 at threaded end 12 and permitting jaw 21 to move outwardly, i.e., to the reader's right. In effect, jaws 13 and 21 are now "open," although jaw 13 actually has remained stationary.

If, for example, the integrity of bond line 80 at the interface of skin 72 and core cell wall 73 is to be tested, the invention is placed, as shown in FIG. 1, on honeycomb panel structure 70, with jaws 13 and 21 in an open position and core cell wall 73 between them.

Then, knurled knobs 61 and 62 of support and guide means 50 are rotated until the vertical axis of rod 11 is aligned with core cell wall 73 and footings 65 and 66 are level on the top surface of the core cell 71.

Knurled knob 25 of gripping means 10 is then turned clockwise, i.e., to the reader's left, until it cannot any longer be turned because of interposed spacer 49 and collar 43, thereby drawing up rod 11 and closing jaws 13 and 21 by causing components 14 and 17 to come together as the result of these components (14 and 17) tightly abutting the beveled bottom periphery 38 of tube 31. This results in the gripping, i.e., the grasping and the firmly holding, of core cell wall 73.

The means for gripping 10 passes through the center of first hollow cylindrical tube 51 and cooperates with the tensile pull means 30 by having spring 40 act against collar 43 which, in turn, acts against knob 25 which thereby transmits the tensile force to rod 11 when trigger pin 48 is released.

Trigger 45 is then pulled away from stationary tube 51 of support means 50. As a result, trigger pin 48 is withdrawn from aligned openings 52 (of stationary tube 51) and 35 (of tube 31).

If bond line 80 fails to meet the desired integrity as established by the tensile pull exerted by the preset compression of spring 40, tube 31 will move upwardly, within stationary tube 51, in slots 36 and 37, with jaws 13 and 21 pulling and detaching core cell wall 73 from bond line 80.

If, on the other hand, bond line 80 meets the desired integrity, then nothing occurs after trigger 45 is pulled and pin 48 is withdrawn from openings 52 and 35.

While there has been shown and described the fundamental features of my invention, as applied to a preferred and particular embodiment, it is to be understood that this is by way of illustration only and is not intended as a limitation, and that various substitutions and omissions may be made by those skilled in the art without departing from the spirit of the invention. For example, trigger 45 may be mounted 90° from the position shown, i.e., on the far side; trigger 45, trigger pin 48 and fasteners 46 and 47 can be eliminated where the desired tolerance in tensile pull can be ascertained by visual observation of the compression of spring 40; a pneumatic cylinder may be used in place of spring 40; and adjustable footings 65 and 66 can be readily replaced by others which will extend through the core cell opening and will rest directly on the skin 72.

Additionally, although the mode of operation of the preferred embodiment has been described as it applies to the testing of the integrity of the bond line of a honeycomb panel structure, the invention is suitable for testing the bond line of any structure where one of the components can be gripped by the jaws of the tool.

I claim:

1. A tool for testing the integrity of the bond line at the interface of the skin and core of a honeycomb panel structure, comprising:

a. means for gripping a wall of a core cell of the honeycomb panel, wherein said means for gripping, includes:
    1. a rod threaded at one end, tapered at the other end to form a jaw, and having a longitudinal aperture near the jaw end;
    2. a first half-pear configurated component, affixed to the lower portion of said rod, having a flanged upper end, a longitudinal aperture in line with said aperture of said rod, and a journaled longitudinal portion between said flanged upper end and said longitudinal aperture;
    3. a second half-pear configurated component having a flanged upper end, a jaw configurated lower end shaped to mate with said jaw of said rod, a longitudinal aperture in line with said aperture of said rod and with said aperture of said first half-pear configurated component, and a journaled longitudinal portion between said flanged upper end and said longitudinal aperture;
    4. an aligning and holding pin of dimensions suitable for fitting into and aligning said longitudinal apertures of said rod, said first pearlike configurated component and said second pearlike configurated component, and for holding said components together;
    5. a retaining ring, with a vertical slit, with said retaining ring of suitable dimensions for fitting into said journaled portions of said first and second pearlike configurated components, and for holding said components together;
    6. and, a knob holed and threaded at its geometric center to mate with the threaded end of said rod.
  b. means for applying a controlled tensile pull to the bond line at the skin-to-core interface by pulling on the gripped core cell wall, wherein said means for applying a controlled tensile pull to the bond line, includes:
    1. a first hollow cylindrical tube having four suitably positioned openings in its wall, a beveled bottom periphery, diametrically opposed slots in its wall, and an alignment groove in its wall extending upwardly for a predetermined length from said beveled bottom periphery;
    2. a cylindrical coil spring, wholly within said first hollow cylindrical tube, compressed to a predetermined length and disposed between pins at its lower end, and at its upper end by a collar having a longitudinal opening, with said collar being held in position at the top of said hollow cylindrical tube by a retaining pin fitted into one of said openings in said first hollow cylindrical tube and the opening in said collar;
    3. and, a trigger with a trigger pin affixed thereto and an upwardly extending loop, mounted on said first hollow cylindrical tube, and releasably engaged to said first hollow cylindrical tube by said trigger pin which fits into one said suitably positioned opening in said first hollow cylindrical tube;
  with said means said means for gripping passing through the center of said first hollow cylindrical tube and cooperating with the tensile pull means by having said spring act against said collar which, in turn, acts against said knob which thereby transmits the tensile force to said rod when said trigger pin is released; and c. means for supporting and guiding said gripping means and said tensile pull means.

2. A tool, as set forth in claim 1, wherein said means for supporting and guiding said gripping means and said tensile pull means, includes:

a. a second hollow cylindrical tube having three suitably positioned openings in its wall, with two of said openings being diametrically opposed, and with said second hollow cylindrical tube surrounding said first hollow cylindrical tube and being attached thereto;

b. a plurality of winglike support plates affixed to the external surface of said hollow cylindrical tube;

c. a boss affixed to the terminus of each winglike support plate, with each said boss being holed and threaded vertically;

d. and, a plurality of swivel pad clamps, with one swivel pad clamp for each said boss, and each said swivel pad clamp having a vertical post threaded to mate with, and fitted into and through, its respective threaded boss, with each said threaded post having integral to it, and perpendicular to its long axis, a knurled knob at the upper end and a footing at the lower end, with said footing being joined to said post by a ball-and-socket joint.